(12) United States Patent
Sato (10) Patent No.: US 7,557,938 B2
(45) Date of Patent: Jul. 7, 2009

(54) PRINTING CONTROL DEVICE AND METHOD, PRINTING APPARATUS AND METHOD, STORAGE MEDIUM STORING COMPUTER-READABLE PROGRAM THEREIN, AND COMPUTER-READABLE PROGRAM

(75) Inventor: Yukimasa Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 911 days.

(21) Appl. No.: 11/010,904

(22) Filed: Dec. 13, 2004

(65) Prior Publication Data

US 2005/0128506 A1    Jun. 16, 2005

(30) Foreign Application Priority Data

Dec. 16, 2003  (JP)  ............................. 2003-418000
Nov. 1, 2004   (JP)  ............................. 2004-317604

(51) Int. Cl.
G06F 3/12    (2006.01)
H04N 1/40    (2006.01)
B65H 29/00   (2006.01)
G06F 13/00   (2006.01)

(52) U.S. Cl. ....................... 358/1.1; 358/3.28; 271/288; 711/163

(58) Field of Classification Search ....................... None
See application file for complete search history.

(56) References Cited

U.S. PATENT DOCUMENTS 4,511,241 A * 4/1985 Tsudaka et al. ............... 399/19
5,359,391 A * 10/1994 Kuroyanagi et al. ........... 399/8
5,752,697 A * 5/1998 Mandel et al. ............... 271/288
6,687,802 B1 * 2/2004 Kori et al. ................... 711/163

FOREIGN PATENT DOCUMENTS

JP    2001-001578 A    1/2001

* cited by examiner

Primary Examiner—Mark K Zimmerman
Assistant Examiner—Mesfin Getaneh
(74) Attorney, Agent, or Firm—Canon USA Inc IP Div (57) ABSTRACT

A printing control method and device for receiving and processing print data including a security level, includes determining the security level of the print data when a predetermine fault occurs during printing processing of the print data and performing different fault recovery processing of the print data in accordance with the determined security level.

20 Claims, 10 Drawing Sheets

| DIRECTORY INFORMATION |
| --- |
| FIRST DATA PROCESSING PROGRAM<br>PROGRAM CODES CORRESPONDING TO STEPS OF<br>FLOWCHART SHOWN IN FIG. 3 |
| SECOND DATA PROCESSING PROGRAM<br>PROGRAM CODES CORRESPONDING TO STEPS OF<br>FLOWCHART SHOWN IN FIG. 4 |
| THIRD DATA PROCESSING PROGRAM<br>PROGRAM CODES CORRESPONDING TO STEPS OF<br>FLOWCHART SHOWN IN FIG. 5 |
| FOURTH DATA PROCESSING PROGRAM<br>PROGRAM CODES CORRESPONDING TO STEPS OF<br>FLOWCHART SHOWN IN FIG. 7 |
| FIFTH DATA PROCESSING PROGRAM<br>PROGRAM CODES CORRESPONDING TO STEPS OF<br>FLOWCHART SHOWN IN FIG. 8 |
| SIXTH DATA PROCESSING PROGRAM<br>PROGRAM CODES CORRESPONDING TO STEPS OF<br>FLOWCHART SHOWN IN FIG. 9 |
| SEVENTH DATA PROCESSING PROGRAM<br>PROGRAM CODES CORRESPONDING TO STEPS OF<br>FLOWCHART SHOWN IN FIG. 10 |

PRINTING CONTROL DEVICE AND METHOD, PRINTING APPARATUS AND METHOD, STORAGE MEDIUM STORING COMPUTER-READABLE PROGRAM THEREIN, AND COMPUTER-READABLE PROGRAM

BACKGROUND OF THE INVENTION

1. Field of the Invention

The present invention relates to printing control devices and printing control methods for controlling printing apparatuses for processing print data including a security level added thereto, to storage media storing computer-readable programs therein, and to computer-readable programs.

2. Description of the Related Art

A technology to prevent documents, securities for example, from being printed in duplicate is known. For example, Japanese Patent Laid-Open No. 2001-001578 describes a technology in which an ID of security print data output in a normal manner is stored in a printer and reprinting is performed only when an ID of print data that is designated to be printed is determined not to have been printed in the normal manner.

Also, a numbering technology is known as a method for preventing duplicate printing. In this technology, a unique number is embedded in printed recording media using digital watermarks. If an illegal printed medium is found, when, where, and who performed the printing is specified.

In known printing control devices, when a recording medium jam occurs during a print job in which a security level is set, the print job is processed similarly to normal print data, in which a security level is not set. Thus, after recovery from the recording medium jam, the print job is printed out and is visible. Accordingly, printing control for a print job in which a security level is set cannot function effectively. Thus, there is little point in carrying out a secure printing process.

For example, recording media can be removed from a printer before toner is fused to the recording media by a fuser, due to an occurrence of a recording media jam. Or, the recording media can be removed from a printer when, due to a recording media jam, toner has been fused to only 1/n of the recording media. In either case, after recovering from the recording media jam, numbering information at the occurrence of the recording media jam is reset in a printing medium in which the recording media jam occurred. Thus, a numbering function cannot return to a normal state, and many printed materials having the same numbered value are generated.

In particular, when printed material is caught in a paper ejection port, multiple copies including the same printed content and having the same numbering information are generated.

SUMMARY OF THE INVENTION

The present invention addresses the above described problems by providing a printing control device, a printing control method, a storage medium storing computer-executable process steps, and computer-executable process steps capable of avoiding a situation where when a predetermined fault occurs in print data including a security level added thereto, after the fault is cleared, printing processing is performed irrespective of the security level. In addition, the present invention addresses the above described problems by efficiently performing printing processing such that, by determining the security level of the print data in the process of printing, numbering information is output in a normal state, and different fault recovery processing is performed on the print data in accordance with the determined security level when the predetermined fault occurs in the process of receiving and processing the print data including the security level added thereto.

According to an aspect of the present invention, a printing control device for receiving and processing print data including a security level added thereto includes a determination unit for determining the security level of the print data when a predetermined fault occurs during printing processing of the print data, and a control unit for performing different fault recovery processing on the print data in accordance with the security level determined by the determination unit.

The predetermined fault may be a jam of a supplied recording medium.

The printing control device may further include an authentication unit for authenticating a requester who requests a change of the set security level, and a setting unit for setting the security level when the authentication unit authenticates the requester.

The printing control device may further include a counting unit for counting up numbering information in the print data when the printing processing is suspended due to the predetermined fault.

The printing control device may further include an image processing unit for embedding the numbering information counted up by the counting unit in the print data as a digital watermark.

When the determination unit determines that the security level is greater than or equal to a predetermined value, the control unit may not perform the fault recovery processing on the print data.

When the determination unit determines that the security level is greater than or equal to a predetermined value, the control unit may add the numbering information counted up by the counting unit to the print data and performs re-rendering processing.

When the determination unit determines that the security level is greater than or equal to a predetermined value, the control unit may delete the numbering information added to an area in which rendering is performed based on the print data and re-render numbering information counted up by the counting unit.

According to another aspect of the present invention, a printing control method in a printing control device for receiving and processing print data including a security level added thereto includes a determination step of determining the security level of the print data when a predetermined fault occurs during printing processing of the print data, and a control step of performing different fault recovery processing on the print data in accordance with the security level determined by the determination step.

The predetermined fault may be a jam of a supplied recording medium.

The printing control method may further include an authentication step of authenticating a requester who requests a change of the set security level; and a setting step of setting the security level when the authentication step authenticates the requester.

The printing control method may further include a counting step of counting up numbering information in the print data when the printing processing is suspended due to the predetermined fault.

The printing control method may further include an image processing step for embedding the numbering information counted up by the counting step in the print data as a digital watermark.

When the determination step determines that the security level is greater than or equal to a predetermined value, the control step may not perform the fault recovery processing on the print data.

When the determination step determines that the security level is greater than or equal to a predetermined value, the control step may add the numbering information counted up by the counting step to the print data and performs re-rendering processing.

When the determination step determines that the security level is greater than or equal to a predetermined value, the control step may delete the numbering information added to an area in which rendering is performed based on the print data and re-render numbering information counted up by the counting step.

According to still another aspect of the present invention, a storage medium stores computer-executable process steps for performing the foregoing printing control method.

According to still another aspect of the present invention, computer-executable process steps perform the foregoing printing control method.

According to the present invention, in a situation when a predetermined fault occurs in print data including a security level added thereto, after the fault is cleared, printing processing performed irrespective of the security level is avoided. Also, numbering information can be output in a normal state and printing processing can be effectively performed.

Thus, generation of illegal printed materials due to an occurrence of a recording media jam can be avoided. This results in a printing environment with increased security.

Further aspects, features and advantages of the present invention will become apparent from the following description of the exemplary embodiments with reference to the attached drawings.

DESCRIPTION OF THE EXEMPLARY EMBODIMENTS

Exemplary embodiments of the present invention will be described with reference to the drawings.

First Embodiment

Figure 1:
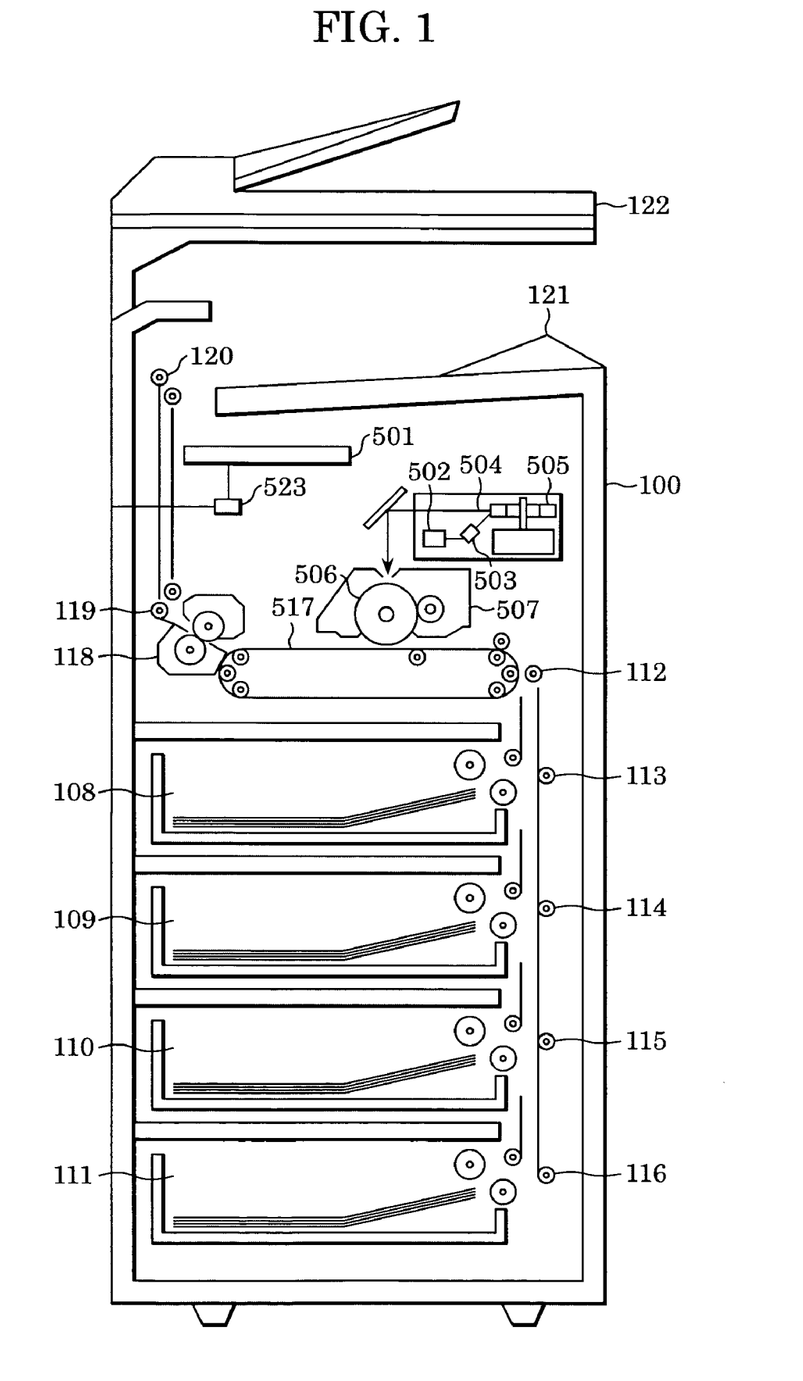
FIG. 1 is a sectional view showing an example of a composite image processing apparatus for which an output control device according to a first embodiment of the present invention is used.

FIG. 1 is a sectional view showing an example of a composite image processing apparatus for which an output control device according to a first embodiment of the present invention is used. The composite image processing apparatus corresponds to, for example, a multifunction product (MFP) 100 having a printer function, a copy function, and a facsimile function.

The MFP 100 can be used as a network printer for receiving and printing print data via a network. Furthermore, the MFP 100 can be connected to a telephone circuit and used as a facsimile machine. The MFP 100 can also be used as a stand-alone copying machine.

An operation panel 121 includes an operation switch and a liquid crystal touch panel for displaying the state of the MFP 100 and the like. Even though a liquid crystal touch panel is described, any user interface that would allow practice of the present invention is applicable.

A control unit 501 includes a central processing unit (CPU) (not shown), a random-access memory (RAM) (not shown), a read-only memory (ROM) (not shown), and the like for controlling the MFP 100.

A laser driver 502 is a circuit for driving a semiconductor laser oscillator 503 and switches on and off a laser beam 504 to be emitted from the semiconductor laser oscillator 503 in accordance with an input video signal. The laser beam 504 is scanned over an electrostatic drum 506 while being oscillated in a horizontal direction by a rotating polygonal mirror 505, so that an electrostatic latent image is formed on the electrostatic drum 506. A developing unit (toner cartridge) 507 disposed around the electrostatic drum develops the electrostatic latent image. The electrostatic latent image is then transferred to a recording media.

Cut recording media are loaded in recording media feeding cassettes 108, 109, 110, and 111 installed in the MFP 100. The recording media are fed into the apparatus via recording media feeding rollers 113, 114, 115, and 116, and are put on a recording media delivery belt 517 via a recording media delivery roller 112 to pass through an image forming and developing mechanism.

Accordingly, toner (powdered ink) transferred to the recording media supplied as described above is fused to the recording media by a fuser 118 as a result of heat and pressure. The recording media to which the toner is fused is ejected from the MFP 100 by delivery rollers 119 and 120.

Reference numeral 122 denotes a scanner. When a document is set and an instruction for copying is received from the operation panel 121, the document is captured in a platen and exposed to a halogen lamp (not shown) in order to capture a reflected image of the document. The captured image undergoes an analog-to-digital (A/D) conversion and is sent to the control unit 501. The image is subjected to necessary processing to be converted into a video signal, and is then input to the laser driver 502.

In addition, when print data is sent via an external network, the print data is analyzed within the control unit 501 to be converted into a video signal, and is then input to the laser driver 502.

In addition, when facsimile data is sent via a telephone circuit, the facsimile data is captured in the control unit 501 via a modem 523, and is then converted into a video signal. Then, the video signal is input to the laser driver 502.

Figure 2:
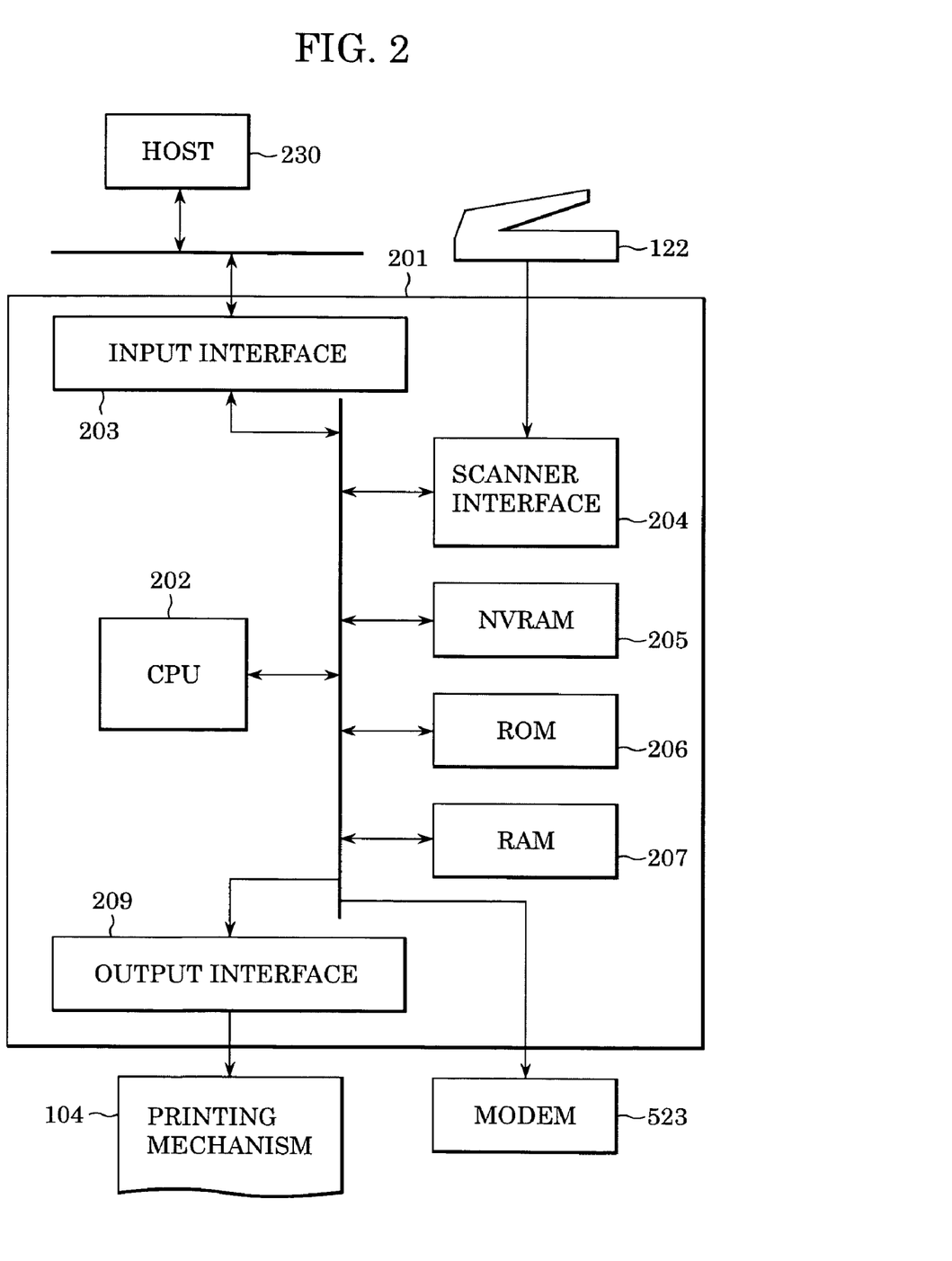
FIG. 2 is a block diagram showing the schematic structure of a control unit of a multifunction product shown in FIG. 1.

FIG. 2 is a block diagram showing the schematic structure of the control unit 501 of the MFP 100 shown in FIG. 1.

FIG. 2 is a block diagram showing the schematic structure of the control unit 501 of the MFP 100 of FIG. 1. Referring to FIG. 2, reference numeral 201 denotes a controller board. A host computer 230 transfers print data to the MFP 100 via a printer driver installed in a storage device (not shown) on the host computer 230. The print data is captured by the input interface 203.

When an instruction for copying is received from the operation panel 121, an image read by the scanner 122 is captured via a scanner interface 204. The image is then subjected to necessary processing by a CPU 202 to convert the image into dot data.

In addition, according to the present embodiment, a password is input by the operation panel 121 to set a security level by which the existence or absence of a recording media jam recovery can be determined. In present embodiment, a password is required for setting a security level (authentication process for setting the security level).

The security level indicates a case where security is set or a case where security is not set. If a security level is greater than or equal to a predetermined value, it is determined that security is set. If a security level is less than the predetermined value, it is determined that security is not set.

In addition, the security level can be categorized into three or more levels. In this case, it is determined whether a security level is greater than or equal to a predetermined level from among the three or more levels. In addition, the security level can be regarded as being a security setting, such as a designation for numbering or a designation for printing out after inputting a password. In other words, after the authentication process is successfully completed, the system according to the present embodiment allows a user to set a security level as described above or change the set security level previously based on user's instructions through the operation panel 121 or user's instructions entered from the host 230.

Returning to FIG. 2, the generated dot data is then sent to a printing mechanism 104 via an output interface 209 to be printed. The processing performed here includes, for example, converting a read resolution for the scanner 122 into a print resolution for the printing mechanism 104 and rotation processing according to a recording media delivery direction in the printing mechanism 104.

The facsimile data received from the modem 523 connected to the telephone circuit is processed in the CPU 202 and then converted into dot data. The generated dot data is then sent to the printing mechanism 104 via the output interface 209 to be printed. The processing performed here includes, for example, decompressing Huffman-compressed print data.

All the series of processing procedures performed by the CPU 202 are programmed in a ROM 206. The CPU 202 operates based on computer-executable process steps.

Data from the host computer 230, the scanner 122, and the modem 523 is stored on a RAM 207 and subjected to necessary processing.

A non-volatile memory 205 includes a general electrically erasable programmable read-only memory (EEPROM) and is referred to as a non-volatile RAM (NVRAM) in the following description. A panel setting value designated in the operation panel 121 is stored in the NVRAM 205.

Figure 3:
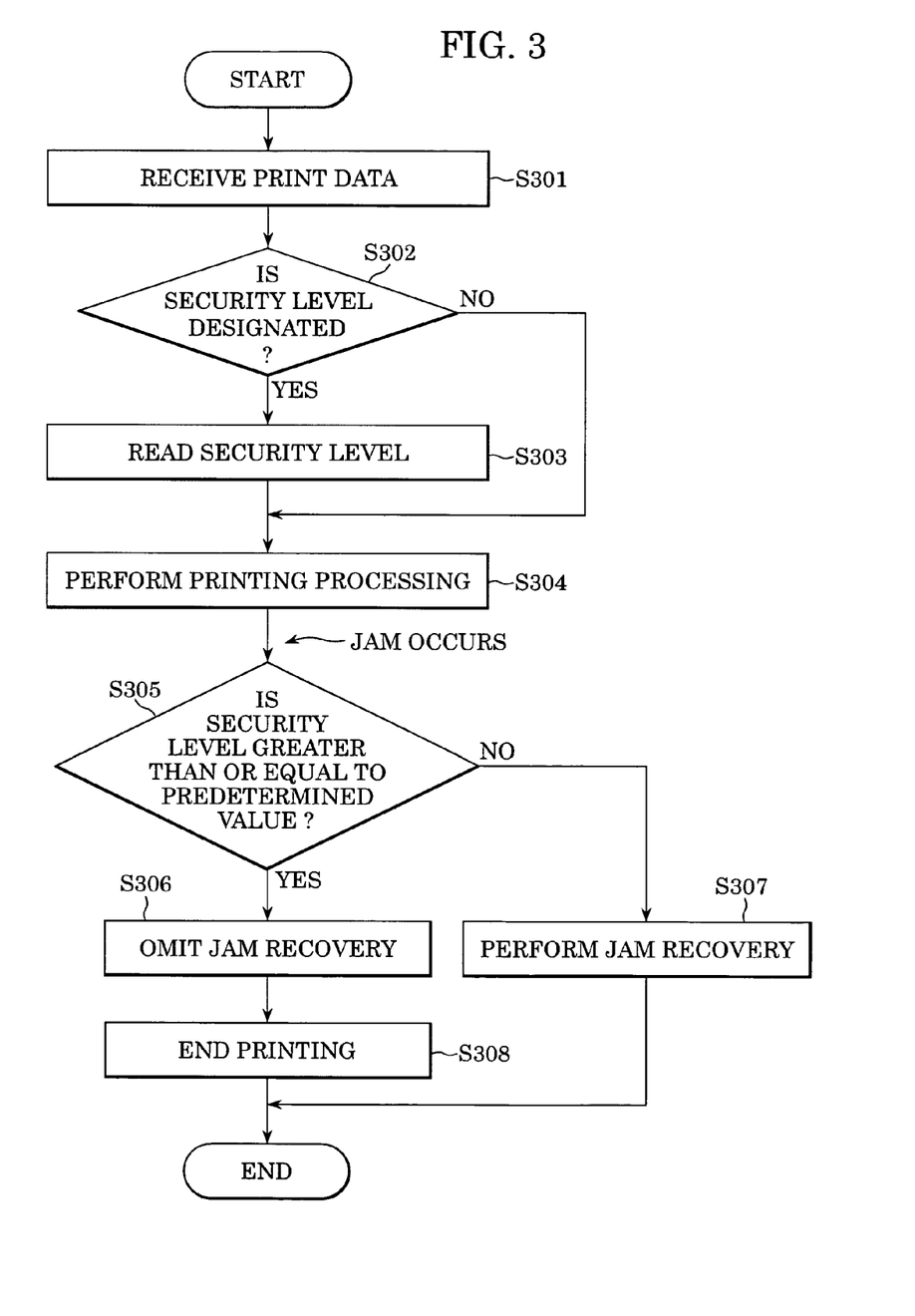
FIG. 3 is a flowchart showing an example of a first data process performed by a printing control device according to the present invention.

FIG. 3 is a flowchart showing an example of a first data process performed by the printing control device according to the present invention. This process corresponds to a control process performed by the controller board 201 when a recording media jam occurs during printing.

In step S301, print data is received from the host computer 230 or the like, via the input interface 203. The print data is temporarily kept in a buffer held within the RAM 207, and in step S302, the CPU 202 determines whether a security level is designated in the print data. If it is determined that a security level is set, then in step S303, the security level is read, and in step S304, normal printing processing is performed. If it is determined that a security level is not set, then flow proceeds directly to step S304.

(Jam Occurrence)

If a recording media jam occurs between steps S304 and S305, the operation of the engine stops. After a user clears the recording media jam, and a predetermined open and closing gate is returned to a predetermined position, a rotation driving system is operated for a predetermined time in order to perform predetermined recovery processing to determine whether other recording media jams have occurred.

In step S305, as part of the predetermined recovery processing, the CPU 202 determines whether the security level set in the print data is greater than or equal to a predetermined value. This determination may be, for example, whether a security designation of a predetermined type (i.e., setting for numbering) is provided. This determination step is also applied to steps S405, S505, S705, S805, S905, and S1005, as described below.

If it is determined in step S305 that the security level is greater than or equal to the predetermined value, flow proceeds to step S306 where predetermined jam recovery is omitted. Then, in step S308, the printing processing ends followed by the end of the process.

On the other hand, if in step S305, it is determined that the security level is less than the predetermined value, the predetermined jam recovery is performed in step S307. More specifically, re-outputting of the job stopped due to the recording media jam is performed.

Accordingly, when jam recovery is performed, the host 230 determines the value of the security level added to printing information. Thus, a situation where a job with a high security level is released to the public can be effectively prevented.

Second Embodiment

A case where jam recovery processing is controlled in accordance with the security level is explained in the embodiment described above. However, if a function to number the number of printed materials is performed in parallel with security level printing, when printing processing is resumed by the jam recovery, numbering information at the occurrence of the recording media jam may be updated in order to obtain a printed result including numbering information added thereto without duplicate numbering.

Figure 4:
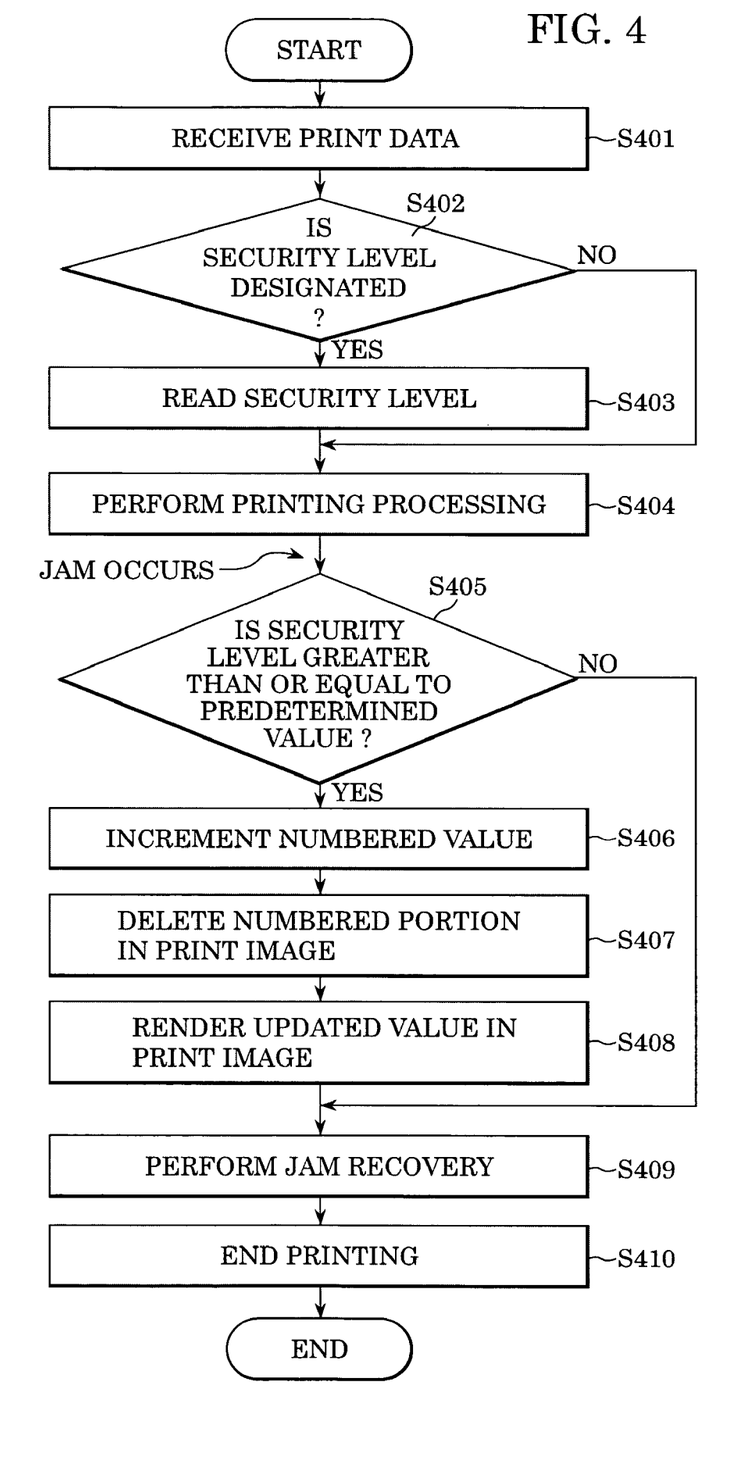
FIG. 4 is a flowchart showing an example of a second data process performed by the printing control device according to the present invention.

FIG. 4 is a flowchart showing an example of a second data process performed by the printing control device according to the present invention. This process corresponds to a control process performed by the controller board 201 when a recording media jam occurs during printing.

First, in step S401, print data is received from the host computer 230 or the like via the input interface 203. The print data is temporarily kept in a buffer held within the RAM 207, and in step S402, the CPU 202 determines whether a security level is designated in the print data. If it is determined that a security level is set, then in step S403, the security level is read. Next, in step S404, numbering printing processing is performed such that if a plurality of copies of a document is printed, a numbered value is incremented when each copy is printed, and the incremented numbered value is added to each copy and rendered to be printed. In the numbering printing processing, for example, the first copy of the document is printed by adding 1, the second copy of the document is printed by adding 2, the third copy of the document is printed by adding 3, and the fourth copy of the document is printed by adding 4.

(Jam Occurrence)

If a recording media jam occurs between steps S404 and S405, the operation of the engine stops. After a user clears the recording media jam and a predetermined open and closing gate is returned to a predetermined position, a rotation driving system is operated for a predetermined time in order to perform predetermined recovery processing to determine whether other recording media jams have occurred.

In the predetermined recovery processing, the CPU 202 determines whether the security level set in the print data is greater than or equal to a predetermined value (step S405). If it is determined that the security level is greater than or equal to the predetermined value in step S405, then in step S406, the numbered value is incremented. Next, in step S407, a portion in which the numbered value is provided is deleted from the generated print image. Accordingly, output materials including the same printed content and having the same numbered value will not exist.

The numbered value updated in step S406 is rendered and embedded in the image in step S408, and printing is then resumed.

If however, in step S405, the CPU 202 determines that the security level is less than the predetermined value, and then a predetermined jam recovery is performed in step S409. More specifically, re-outputting of the job stopped due to the recording media jam is performed. In other words, if the determination in step S405 is N, numbering printing is performed in accordance with the numbered value at the occurrence of the recording media jam. If the determination in step S405 is Y, numbering printing is performed in accordance with the numbered value +1, which is obtained by incrementing the value at the occurrence of the recording media jam, in steps S406, S407, and S408. Printing end processing is performed in step S410, and then the process ends.

Accordingly, a situation where numbering information becomes illegal due to jam processing is prevented. Thus, print data provided with a normally numbered value is generated in a short time, and printing processing for the print data can be resumed with high efficiency.

Third Embodiment

A case where jam recovery processing is controlled in accordance with the security level is explained in the above-described embodiments. However, if a function to number the number of printed materials is performed in parallel with security level printing, when printing processing is resumed by the jam recovery, numbering information at the occurrence of the recording media jam may be updated in order to obtain a printed result including numbering information added thereto without duplicate numbering.

In the present embodiment, in the process of printing, in order to carry out jam processing, an undithered image is maintained until printing of the current page ends.

Figure 5:
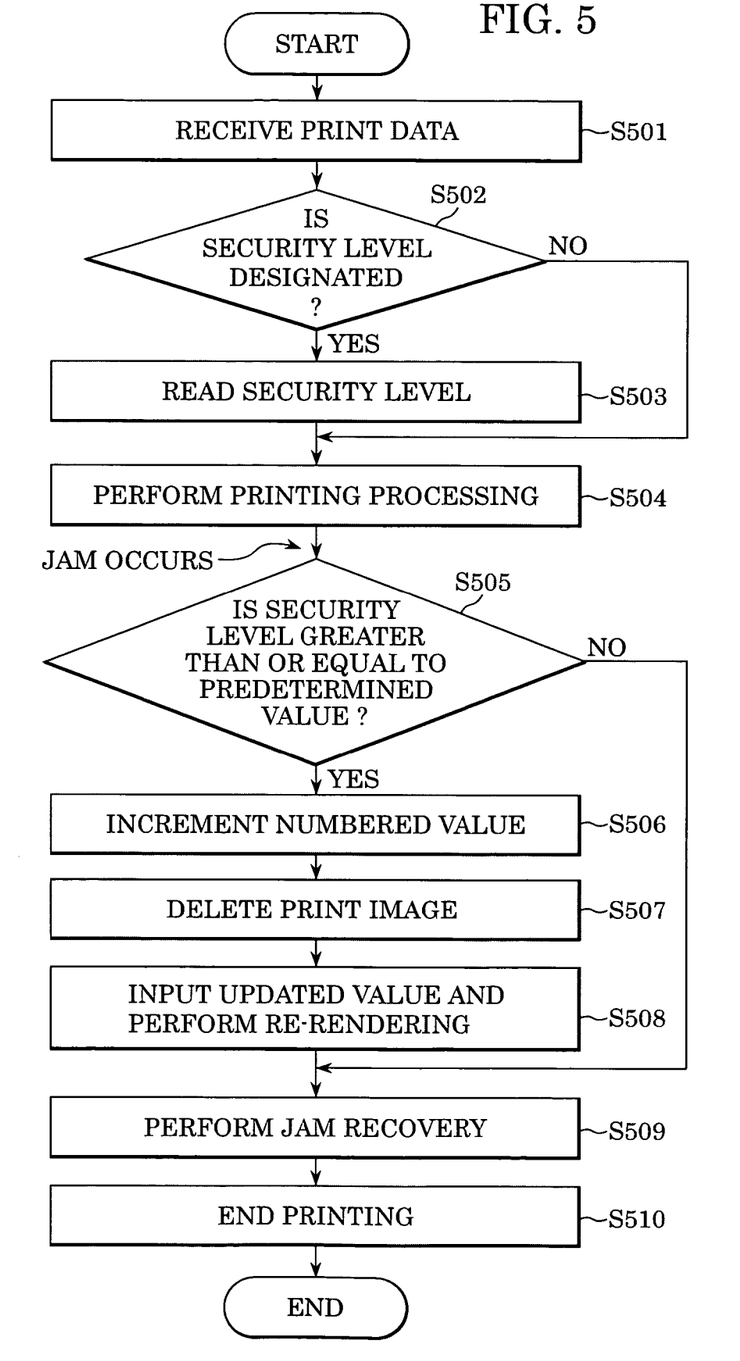
FIG. 5 is a flowchart showing an example of a third data process performed by the printing control device according to the present invention.

FIG. 5 is a flowchart showing an example of a third data process performed by the printing control device according to the present invention. This process corresponds to a control process performed by the controller board 201 when a recording media jam occurs during printing.

First, in step S501, print data is received from the host computer 230 or the like via the input interface part 203. The print data is temporarily kept in a buffer held within the RAM 207. Next, in step S502, the CPU 202 determines whether a security level is designated in the print data. If it is determined that a security level is set, then in step S503, the security level is read. Next, in step S504, numbering printing processing is performed such that if a plurality of copies of a document is printed, a numbered value is incremented when each copy is printed, and the incremented numbered value is added to each copy and rendered to be printed.

(Jam Occurrence)

If a recording media jam occurs between steps S504 and S505, the operation of the engine stops. After a user clears the recording media jam, and a predetermined open and closing gate is returned to a predetermined position, a rotation driving system is operated for a predetermined time in order to perform predetermined recovery processing to determine whether other recording media jams have occurred.

In the predetermined recovery processing, the CPU 202, in step S505, determines whether the security level set in the print data is greater than or equal to a predetermined value. If it is determined that the security level is greater than or equal to the predetermined value, the numbered value is incremented in step S506.

Then, in step S507, the generated print image is disposed of. Next, in step S508, the numbered value updated by step S506 is embedded, using a digital watermark, in the undithered image held within the RAM 207 until processing for the current page is completed, and a new print image is generated. Flow then proceeds to step S509, where predetermined jam recovery is performed, and printing is resumed. In other words, if the determination in step S505 is N, numbering printing is performed in accordance with the numbered value at the occurrence of the recording media jam. If the determination in step S505 is Y, numbering printing is performed in accordance with the numbered value +1, which is obtained by incrementing the value at the occurrence of the recording media jam, in steps S506, S507, and S508. When all the pages are printed, printing end processing is performed in step S510, and then the process ends.

Accordingly, a situation where numbering information becomes illegal due to jam processing is prevented. Thus, print data provided with a normally numbered value is generated in a short time, and printing processing for the print data can be resumed with high efficiency.

The structure of data processing programs that are readable by the printing control device according to the present invention will be described with reference to a memory map shown in FIG. 6.

Figure 6:
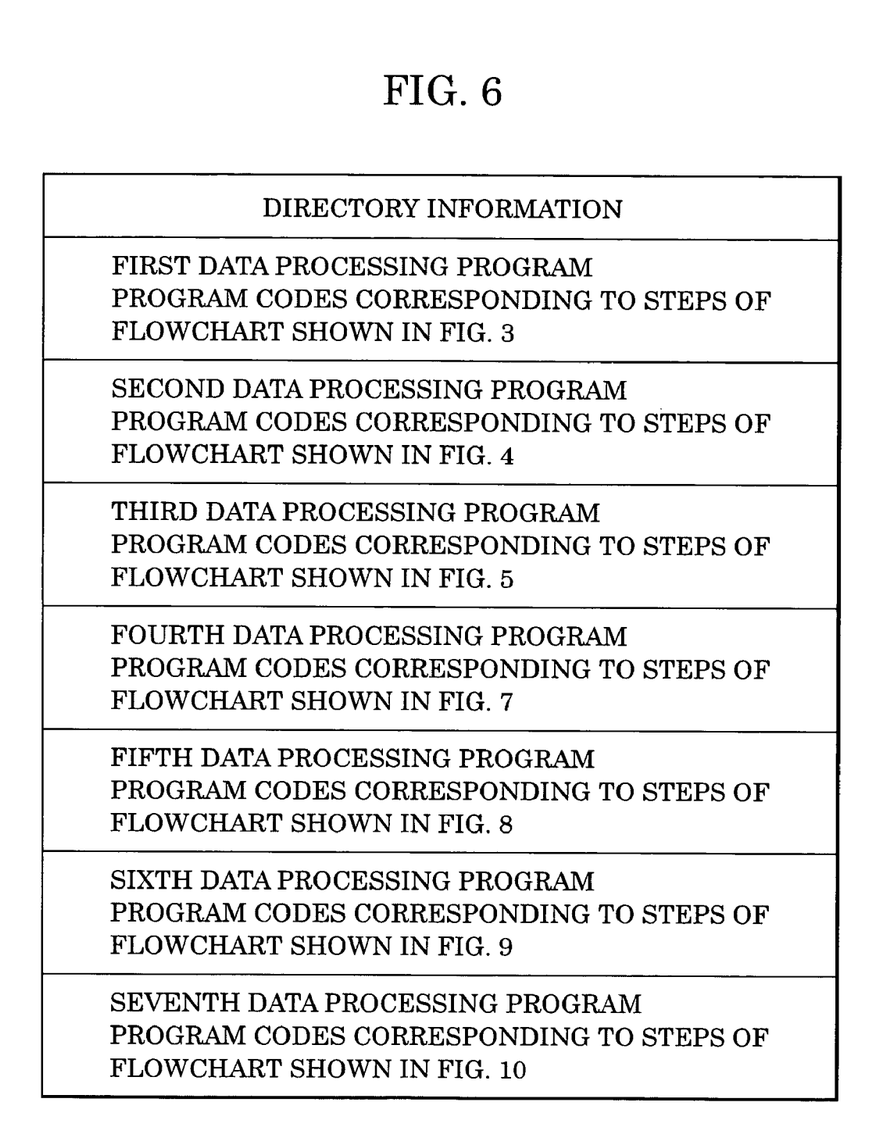
FIG. 6 illustrates a memory map of a storage medium storing various data processing programs that can be read by the printing control device according to the present invention.

FIG. 6 illustrates the memory map of a storage medium, such as a floppy disk or a compact disk (CD)-ROM, for storing the various data processing programs that are readable by the printing control device according to the present invention.

Fourth Embodiment

A case where jam recovery processing is controlled in accordance with the security level is explained in the above-described embodiments. However, if a function to number the number of printed materials is performed in parallel with security level printing, when printing processing is resumed by the jam recovery, numbering information at the occurrence of the recording media jam may be updated in order to obtain a printed result including numbering information added thereto without duplicate numbering.

Figure 7:
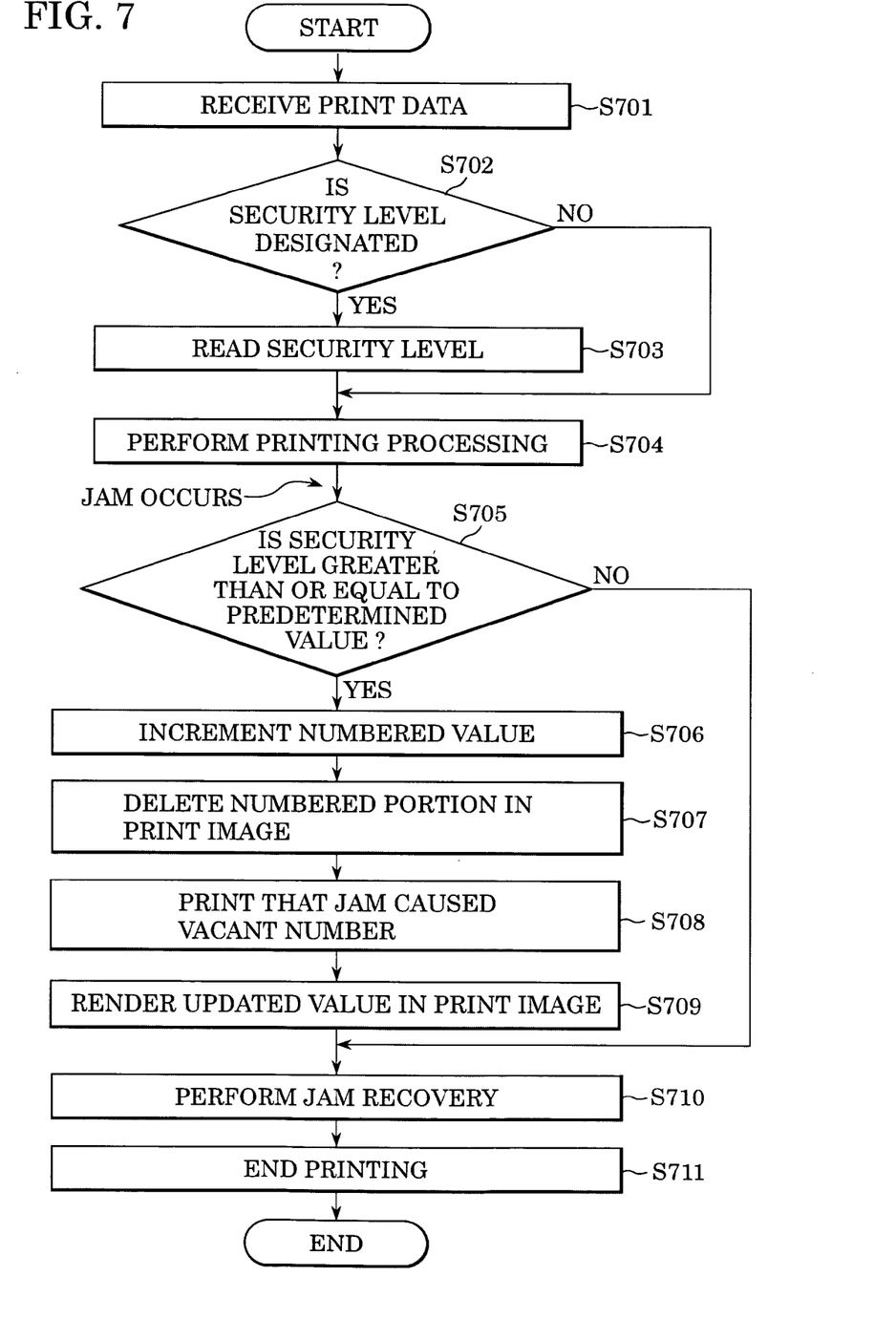
FIG. 7 is a flowchart showing an example of a fourth data process performed by the printing control device according to the present invention.

FIG. 7 is a flowchart showing an example of a fourth data process performed by the printing control device according to the present invention. This process corresponds to a control process performed by the controller board 201 when a recording media jam occurs during printing.

First, in step S701, print data is received from the host computer 230 or the like via the input interface 203. The print data is temporarily kept in a buffer held within the RAM 207. The CPU 202, in step S702, then determines whether a security level is designated in the print data. If it is determined that a security level is set, then flow proceeds to step S703, where the security level is read. Then, in step S704, numbering printing processing is performed such that if a plurality of copies of a document is printed, a numbered value is incremented when each copy is printed, and the incremented numbered value is added to each copy and rendered to be printed.

(Jam Occurrence)

If a recording media jam occurs between steps S704 and S705, the operation of the engine stops. After a user clears the recording media jam, and a predetermined open and closing gate is returned to a predetermined position, a rotation driving system is operated for a predetermined time in order to perform predetermined recovery processing to determine whether other recording media jams have occurred.

In the predetermined recovery processing, the CPU 202, in step S705, determines whether the security level set in the print data is greater than or equal to a predetermined value. If it is determined that the security level is greater than or equal to the predetermined value in step S705, then in step S706, the numbered value is incremented. Next, a portion in which the numbered value is provided is deleted from the generated print image in step S707. Accordingly, output materials including the same printed content and having the same numbered value will not exist.

Flow then proceeds to step S708, where the fact that the recording media jam caused a vacant number is printed to inform the user. The numbered value updated in step S706 is rendered and embedded in the image in step S709, and printing is then resumed.

In contrast, if in step S705 the CPU 202 determines that the security level is less than the predetermined value, predetermined jam recovery is performed in step S710. More specifically, re-outputting of the job stopped due to the recording media jam is performed. In other words, if the determination in step S705 is N, numbering printing is performed in accordance with the numbered value at the occurrence of the recording media jam. If the determination in step S705 is Y, numbering printing is performed in accordance with the numbered value +1, which is obtained by incrementing the value at the occurrence of the recording media jam, in steps S706, S707, S708 and S709. Then, printing end processing is performed in step S711, and then the process ends.

Accordingly, a situation where numbering information becomes illegal due to jam processing is prevented. Thus, print data provided with a normally numbered value is generated in a short time, and printing processing for the print data can be resumed with high efficiency.

Fifth Embodiment

A case where jam recovery processing is controlled in accordance with the security level is explained in the above-described embodiments. However, if a function to number the number of printed materials is performed in parallel with security level printing, when printing processing is resumed by the jam recovery, numbering information at the occurrence of the recording media jam may be updated in order to obtain a printed result including numbering information added thereto without duplicate numbering.

In the present embodiment, in the process of printing, in order to carry out jam processing, an undithered image is maintained until printing of the current page ends.

Figure 8:
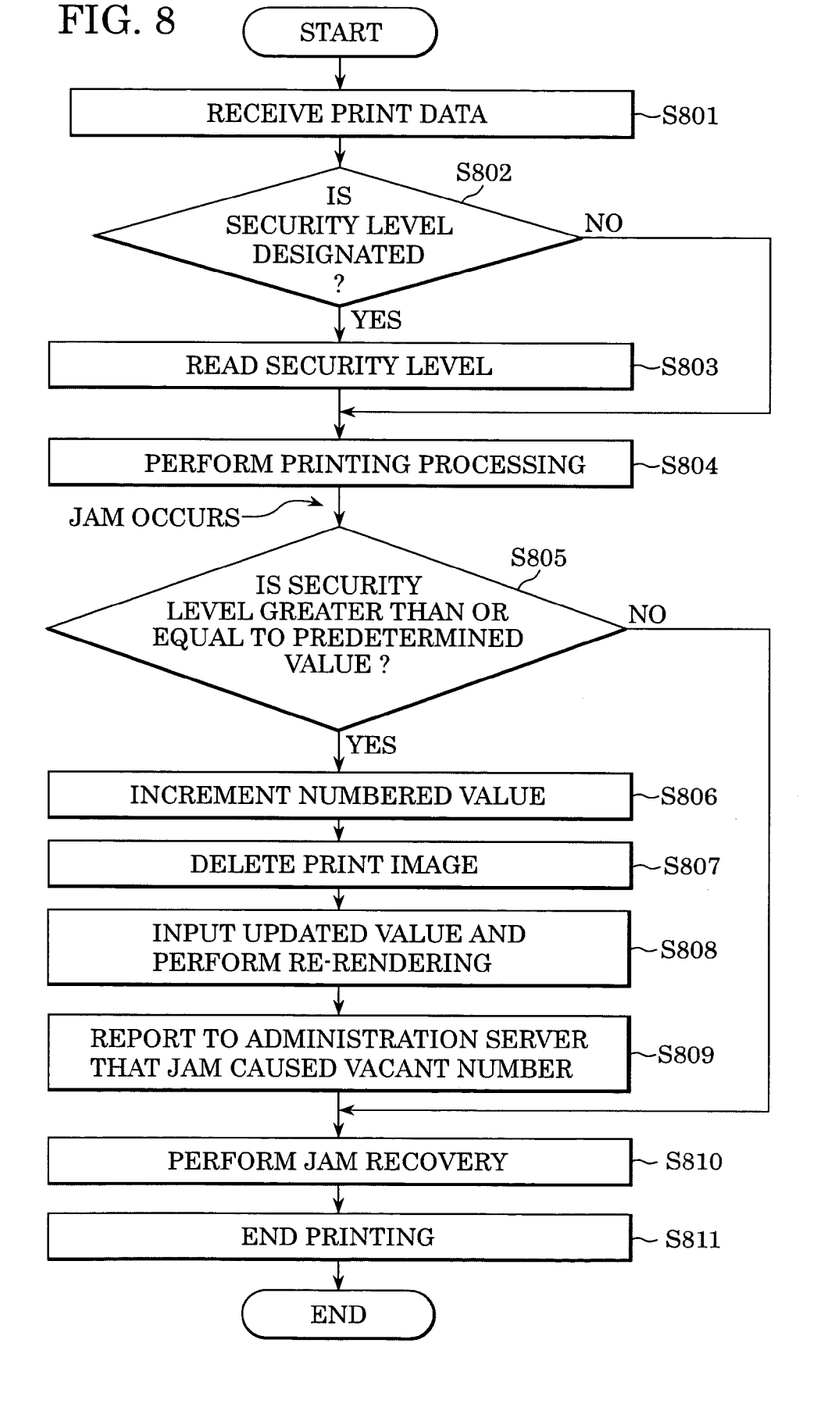
FIG. 8 is a flowchart showing an example of a fifth data process performed by the printing control device according to the present invention.

FIG. 8 is a flowchart showing an example of a fifth data process performed by the printing control device according to the present invention. This process corresponds to a control process performed by the controller board 201 when a recording media jam occurs during printing.

First, in step S801, print data is received from the host computer 230 or the like via the input interface 203. The print data is temporarily kept in a buffer held within the RAM 207. Next, in step S802, the CPU 202 then determines whether a security level is designated in the print data. If it is determined that a security level is set, then the security level is read in step S803. Then, in step S804, numbering printing processing is performed such that if a plurality of copies of a document is printed, a numbered value is incremented when each copy is printed, and the incremented numbered value is added to each copy and rendered to be printed.

(Jam Occurrence)

If a recording media jam occurs between steps S804 and S805, the operation of the engine stops. After a user clears the recording media jam, and a predetermined open and closing gate is returned to a predetermined position, a rotation driving system is operated for a predetermined time in order to perform predetermined recovery processing to determine whether other recording media jams have occurred.

In the predetermined recovery processing, the CPU 202, in step S805, determines whether the security level set in the print data is greater than or equal to a predetermined value. If it is determined that the security level is greater than or equal to the predetermined value in step S805, the numbered value is incremented in step S806.

Then, in step S807, the generated print image is disposed of. Next, in step S808, the numbered value updated by step S806 is embedded, using a digital watermark, in the undithered image held within the RAM 207 until processing for the current page is completed, and a new print image is generated. Also, the fact that a vacant number exists due to the recording media jam when printing is resumed is reported to the host computer 230 or an administration server. When necessary, in step S809, the vacant number is also reported. Predetermined jam recovery is performed, and printing is resumed in step S810. In other words, if the determination in step S805 is N, numbering printing is performed in accordance with the numbered value at the occurrence of the recording media jam. If the determination in step S805 is Y, numbering printing is performed in accordance with the numbered value +1, which is obtained by incrementing the value at the occurrence of the recording media jam, in steps S806, S807, S808, and S809. When all the pages are printed, printing end processing is performed in step S811, and then the process ends.

Accordingly, a situation where numbering information becomes illegal due to jam processing is prevented. Thus, print data provided with a normally numbered value is generated in a short time, and printing processing for the print data can be resumed with high efficiency.

Sixth Embodiment

A case where jam recovery processing is controlled in accordance with the security level is explained in the above-described embodiments. However, if a function to number the number of printed materials is performed in parallel with security level printing, when printing processing is resumed by the jam recovery, numbering information at the occurrence of the recording media jam may be updated in order to obtain a printed result including numbering information added thereto without duplicate numbering.

Figure 9:
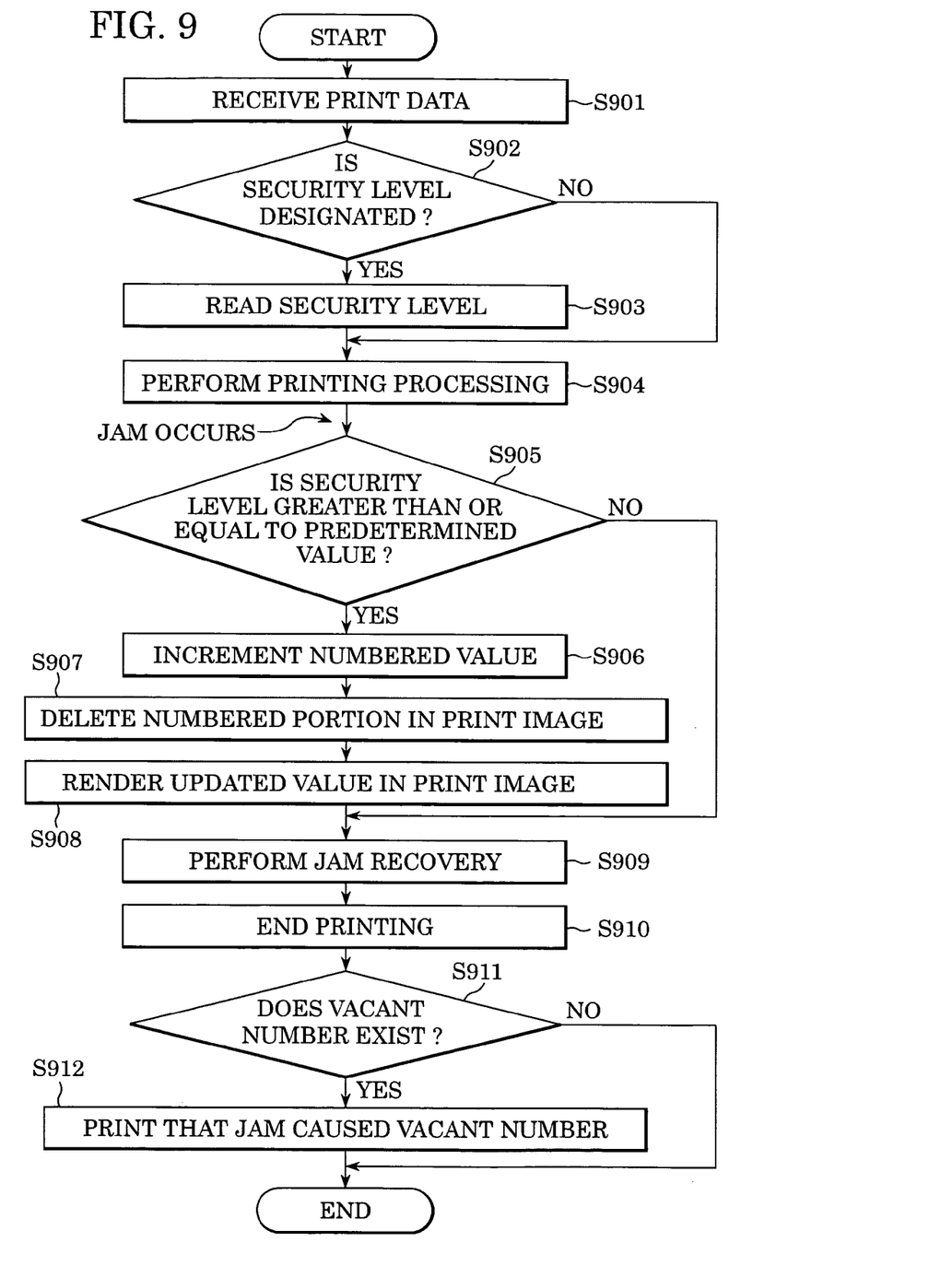
FIG. 9 is a flowchart showing an example of a sixth data process performed by the printing control device according to the present invention.

FIG. 9 is a flowchart showing an example of a sixth data process performed by the printing control device according to the present invention. This process corresponds to a control process performed by the controller board 201 when a recording media jam occurs during printing.

First, in step S901, print data is received from the host computer 230 or the like via the input interface 203. The print data is temporarily kept in a buffer held within the RAM 207. Next, in step S802, the CPU 202 then determines whether a security level is designated in the print data. If it is determined that a security level is set, then the security level is read in step S903. Next, in step S804, numbering printing processing is performed such that if a plurality of copies of a document is printed, a numbered value is incremented when each copy is printed, and the incremented numbered value is added to each copy and rendered to be printed.

(Jam Occurrence)

If a recording media jam occurs between steps S904 and S905, the operation of the engine stops. After a user clears the recording media jam, and a predetermined open and closing gate is returned to a predetermined position, a rotation driving system is operated for a predetermined time in order to perform predetermined recovery processing to determine whether other recording media jams have occurred.

In the predetermined recovery processing, the CPU 202 in step S905 determines whether the security level set in the print data is greater than or equal to a predetermined value. If it is determined that the security level is greater than or equal to the predetermined value, the numbered value is incremented in step S906. Next, in step S907, a portion in which the numbered value is provided is deleted from the generated print image. Accordingly, output materials including the same printed content and having the same numbered value will not exist.

The numbered value updated in step S906 is rendered and embedded in the image in step S908, and printing is then resumed.

In contrast, if in step S905 the CPU 202 determines that the security level is less than the predetermined value in step S905, predetermined jam recovery is performed in step S909. More specifically, re-outputting of the job stopped due to the recording media jam is performed. In other words, if the determination in step S905 is N, numbering printing is performed in accordance with the numbered value at the occurrence of the recording media jam. If the determination in step S905 is Y, numbering printing is performed in accordance with the numbered value +1, which is obtained by incrementing the value at the occurrence of the recording media jam, in steps S906, S907, S908 and S909. Next, printing end processing is performed in step S910, and then in step S911 it is determined whether the recording media jam caused a vacant number during printing. If it is determined that a vacant number exists, after printing, the fact that the vacant number exists and the vacant number are printed in step S912. Then, the process ends.

Accordingly, a situation where numbering information becomes illegal due to jam processing is prevented. Thus, print data provided with a normally numbered value is generated in a short time, and printing processing for the print data can be resumed with high efficiency.

Seventh Embodiment

A case where jam recovery processing is controlled in accordance with the security level is explained in the above-described embodiments. However, if a function to number the number of printed materials is performed in parallel with security level printing, when printing processing is resumed by the jam recovery, numbering information at the occurrence of the recording media jam may be updated in order to obtain a printed result including numbering information added thereto without duplicate numbering.

In present embodiment, in the process of printing, in order to carry out jam processing, an undithered image is maintained until printing of the current page ends.

Figure 10:
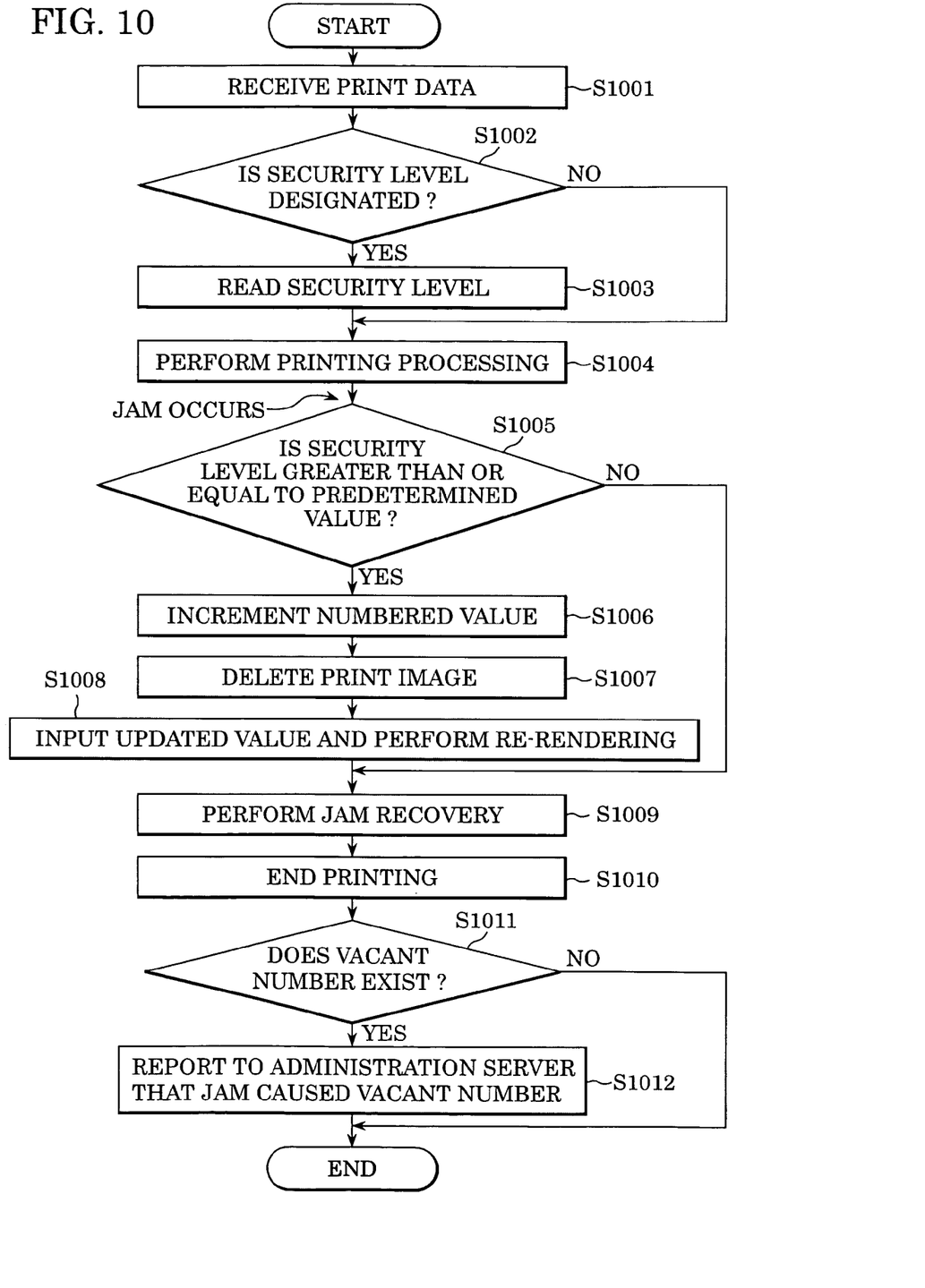
FIG. 10 is a flowchart showing an example of a seventh data process performed by the printing control device according to the present invention.

FIG. 10 is a flowchart showing an example of a seventh data process performed by the printing control device according to the present invention. This process corresponds to a control process performed by the controller board 201 when a recording media jam occurs during printing.

First, in step S1001, is received from the host computer 230 or the like via the input interface 203. The print data is temporarily kept in a buffer held within the RAM 207. Next, in step S1002, the CPU 202 then determines whether a security level is designated in the print data. If it is determined that a security level is set, the security level is read in step S1003. Next, in step s1004, numbering printing processing is performed such that if a plurality of copies of a document is printed, a numbered value is incremented when each copy is printed, and the incremented numbered value is added to each copy and rendered to be printed.

(Jam Occurrence)

If a recording media jam occurs between steps S1004 and S1005, the operation of the engine stops. After a user clears the recording media jam, and a predetermined open and closing gate is returned to a predetermined position, a rotation driving system is operated for a predetermined time in order to perform predetermined recovery processing to determine whether other recording media jams have occurred.

In the predetermined recovery processing, the CPU 202, in step S1005, determines whether the security level set in the print data is greater than or equal to a predetermined value. If it is determined that the security level is greater than or equal to the predetermined value, the numbered value is incremented in step S1006.

Then, in step S1007, the generated print image is disposed of. Next, in step S1008, the numbered value updated by step S1006 is embedded, using a digital watermark, in the undithered image held within the RAM 207 until processing for the current page is completed, and a new print image is generated.

Predetermined jam recovery is performed, and printing is resumed in step S1009. In other words, if the determination in step S1005 is N, numbering printing is performed in accordance with the numbered value at the occurrence of the recording media jam. If the determination in step S1005 is Y, numbering printing is performed in accordance with the numbered value +1, which is obtained by incrementing the value at the occurrence of the recording media jam, in steps S1006, S1007, S1008, and S1009. When all the pages are printed, printing end processing is performed in step S1010. Also, if it is determined in step S1011 that a vacant number exists due to the recording media jam when printing is resumed, the fact that the vacant number exists is reported to the host computer 230 or an administration server. When necessary, in step S1012, the vacant number is also reported. Then, the process ends.

Accordingly, a situation where numbering information becomes illegal due to jam processing is prevented. Thus, print data provided with a normally numbered value is generated in a short time, and printing processing for the print data can be resumed with high efficiency.

Although not illustrated, information, such as version information and the manufacture's name, for managing computer-executable process steps stored in a storage medium and information, such as icons or the like for distinguishably displaying the computer-executable process steps, dependent on an operation system (OS) or the like that reads the computer-executable process steps may be stored.

Furthermore, data dependent on various computer-executable process steps is also managed by the directory. Also, if computer-executable process steps for installing the various computer-executable process steps in a computer or computer-executable process steps to be installed is compressed, computer-executable process steps for decompressing such computer-executable process steps may also be stored.

The functions according to the above-described embodiments with reference to FIGS. 3 to 5 and FIGS. 7 to 10 may be performed by a host computer using computer-executable process steps that are externally installed. In this case, the present invention is also applicable to a case where an information group including the computer-executable process steps is supplied from a storage medium, such as a CD-ROM, a flash memory, or a floppy disk, or an external storage medium via a network to an output device.

As described above, an aspect of the present invention is achieved by supplying a storage medium on which computer-executable process steps for realizing the functions of the foregoing embodiments is stored to a system or an apparatus and by reading and executing the computer-executable process steps stored in the storage medium by a computer (or a CPU or a micro-processing unit (MPU)) of the system or the apparatus.

In this case, the computer-executable process steps read from the storage medium attain new functions of the present invention. The storage medium storing the computer-executable process steps constitutes the present invention.

Thus, as long as a function of computer-executable process steps is included, any type of computer-executable process steps, for example, object code, computer-executable process steps performed by an interpreter, or script data supplied to an OS, may be used in the present invention.

Also, the storage medium for supplying the computer-executable process steps may be, for example, a floppy disk, a hard disk, an optical disk, a magneto-optical (MO) disk, a CD-ROM, a CD recordable (CD-R), a CD-ReWritable (CD-RW), a magnetic tape, a nonvolatile memory card, a ROM, a digital versatile disk (DVD), or the like.

In this case, the computer-executable process steps read from the storage medium attains the functions of the foregoing embodiments. The storage medium storing the computer-executable process steps constitutes the present invention.

In addition, the computer-executable process steps may be supplied by connecting to a homepage on the Internet using a browser of a client's computer and downloading the computer-executable process steps of the present invention or a file including a compressed automatic installation function from the homepage to the recording medium, such as a hard disk. Also, the computer-executable process steps may be supplied by dividing the computer-executable process steps of the present invention into a plurality of files and downloading the files from different homepages. In other words, a World Wide Web (WWW) server, a file transfer protocol (ftp) server, and the like to allow a plurality of users to download the computer-executable process steps so as to cause a computer to realize the functions of the present invention are also included in the claims of the present invention.

Also, the computer-executable process steps according to the present invention encrypted and stored in a storage medium, such as a CD-ROM, may be distributed to users. A user who satisfies predetermined conditions downloads key information for decrypting the encrypted computer-executable process steps from a homepage via the Internet. The encrypted computer-executable process steps can be performed using the key information and installed in a computer.

Also, the functions of the foregoing embodiments can be attained not only by the computer reading the computer-executable process steps but also by performing part or all of the actual processing by an operating system or the like running on the computer on the basis of instructions of the computer-executable process steps.

Furthermore, the functions of the above-described embodiments can also be attained by performing part or all of the actual processing by a CPU or the like arranged in a function expansion board of the computer or a function expansion unit connected to the computer on the basis of instructions of computer-executable process steps read from the storage medium after the computer-executable process steps are written in a memory of the function expansion board or the function expansion unit.

The present invention is not limited to the embodiments described above. Various changes and modifications (including organic combinations of the embodiments described above) may be made to the present invention without departing from the spirit and scope thereof. The various changes and modifications may not be excluded from the scope of the present invention.

Although various examples and embodiments of the present invention have been described, it should be understood by those skilled in the art that the spirit and scope of the present invention are not limited to the particular explanation described above.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-418000 filed Dec. 16, 2003 and Japanese Patent Application No. 2004-317604 filed Nov. 1, 2004, which are hereby incorporated by reference herein.

What is claimed is:

1. A printing control device for receiving and processing print data including a security level added thereto, comprising:

receiving means for receiving print data;

print processing means for performing numbering printing processing, when printing the print data received by the receiving means, which is to add a numbered value, 1 to a first copy and add an incremented numbered value, 2 to a second copy;

determination means for determining the security level of the print data when a jam occurs during printing processing of the print data; and control means for incrementing a numbered value of a document image by one and printing the document image with the incremented numbered value rendered when the security level is determined to be equal to or higher than a predetermined value by the determination means, and re-printing the document image with the numbered value unchanged from the occurrence of the jam when the security level is not determined to be equal to or higher than the predetermined value by the determination means.

2. The printing control device according to claim 1, further comprising authentication means for authenticating a requester who requests a change of the set security level; and setting means for setting the security level when the authentication means authenticates the requester.

3. The printing control device according to claim 1, further comprising image processing means for embedding the numbering information counted up by the counting means in the print data as a digital watermark.

4. The printing control device according to claim 1 wherein the control means increments the numbered value of the document image by one, re-render a document image in accordance with the incremented numbered value and prints the re-rendered document image when the security level is determined to be equal to or higher than the predetermined value by the determination means, and re-prints the document image with the numbered value unchanged from the occurrence of the jam when the security level is not determined to be equal to or higher than the predetermined value by the determination means.

5. The printing control device according to claim 1, the control means increments the numbered value of the document image by one, delete the numbered value of the documents image, render the incremented numbered value to the document image and prints the document image with the incremented numbered value rendered when the security level is determined to be equal to or higher than the predetermined level by the determination means, and re-prints the document image with the numbered value unchanged from the occurrence of the jam when the security level of the document is not determined to be equal to or higher than the predetermined value.

6. A printing control method in a printing control device for receiving and processing print data including a security level added thereto, the method comprising:

a receiving step of receiving print data;

a print processing step of performing numbering printing processing, when printing the print data received by the receiving means, which is to add a numbered value, 1 to a first copy and add an incremented numbered value, 2 to a second copy;

a determination step of determining the security level of the print data when a jam occurs during printing processing of the print data; and a control step of incrementing a numbered value of a document image by one and printing the document image with the incremented numbered value rendered when the security level is determined to be equal to or higher than a predetermined value by the determination means, and re-printing the document image with the numbered value unchanged from the occurrence of the jam when the security level is not determined to be equal to or higher than the predetermined value by the determination means.

7. The printing control method according to claim 6, wherein the predetermined fault is a jam of a supplied recording medium.

8. The printing control method according to claim 6, further comprising:

an authentication step of authenticating a requester who requests a change of the set security level; and a setting step of setting the security level when the authentication step authenticates the requester.

9. The printing control method according to claim 6, further comprising a counting step of counting up numbering information in the print data when the printing processing is suspended due to the predetermined fault.

10. The printing control method according to claim 9, further comprising an image processing step for embedding the numbering information counted up by the counting step in the print data as a digital watermark.

11. The printing control method according to claim 6, wherein when the determination step determines that the security level is greater than or equal to a predetermined value, the control step does not perform the fault recovery processing on the print data.

12. The printing control method according to claim 9, wherein when the determination step determines that the security level is greater than or equal to a predetermined value, the control step adds the numbering information counted up by the counting step to the print data and performs re-rendering processing.

13. The printing control method according to claim 9, wherein when the determination step determines that the security level is greater than or equal to a predetermined value, the control step deletes the numbering information added to an area in which rendering is performed based on the print data and re-renders numbering information counted up by the counting step.

14. A storage medium for storing computer-executable process steps for receiving and processing print data including a security level added thereto, the computer-executable process steps comprising:

determining the security level of the print data when a jam occurs during printing processing of the print data; and incrementing a numbered value of a document image by one and printing the document image with the incremented numbered value rendered when the security level is determined to be equal to or higher than a predetermined value by the determination means, and re-printing the document image with the numbered value unchanged from the occurrence of the jam when the security level is not determined to be equal to or higher than the predetermined value by the determination means.

15. A printing apparatus comprising:

printing means for performing numbering printing processing, when printing print data, which is to add a numbered value, 1 to a first copy and add an incremented numbered value, 2 to a second copy; and jam recovery means for, when performing jam recovery, incrementing a numbered value of a document image by one and printing the document image with the incremented numbered value rendered when security level of the print data is equal to or higher than a predetermined value, and re-printing the document image with the numbered value unchanged from the occurrence of the jam when the security level of the documents image is not equal to or higher than the predetermined image.

16. The printing apparatus according to claim 15, further comprising reporting means for reporting the existence of a vacant number when the jam recovery is performed.

17. A printing method comprising:

a printing step of performing numbering printing processing, when printing print data, which is to add a numbered value, 1 to a first copy and add an incremented numbered value, 2 to a second copy; and a jam recovery step of, when performing jam recovery, incrementing a numbered value of a document image by one and printing the document image with the incremented numbered value rendered when security level of the print data is equal to or higher than a predetermined value, and re-printing the document image with the numbered value unchanged from the occurrence of the jam when the security level of the documents image is not equal to or higher than the predetermined image.

18. The printing method according to claim 17, further comprising a reporting step of reporting the existence of a vacant number when the jam recovery is performed.

19. A computer-readable storage medium storing a computer-executable process, the computer-executable process causing a computer to implement the steps comprising:

performing numbering printing processing, when printing print data, which is to add a numbered value, 1 to a first copy and add an incremented numbered value, 2 to a second copy; and incrementing, when performing jam recovery, a numbered value of a document image by one and printing the document image with the incremented numbered value rendered when security level of the print data is equal to or higher than a predetermined value, and re-printing the document image with the numbered value unchanged from the occurrence of the jam when the security level of the documents image is not equal to or higher than the predetermined image.

20. The computer-readable storage medium storing a computer-executable process according to claim 19, further comprising reporting the existence of a vacant number when the jam recovery is performed.

* * * * *